April 13, 1965   M. E. GEORTLER, JR   3,177,701

MEASUREMENT OF CHANGE IN WEIGHT

Filed Sept. 25, 1962

INVENTOR.
Martin E. Geortler, Jr.
BY
Charles R. Huggett
Attorney

United States Patent Office 3,177,701
Patented Apr. 13, 1965

3,177,701
MEASUREMENT OF CHANGE IN WEIGHT
Martin E. Geortler, Jr., Pine Acres, N.J., assignor to Socony Mobil Oil Company, Inc., a corporation of New York
Filed Sept. 25, 1962, Ser. No. 226,185
6 Claims. (Cl. 73—19)

This invention relates to the determination of changes in weight of a sample under changing environmental conditions. More specifically, it relates to apparatus for the determination of the amount of vapor sorbed from the surrounding atmosphere by a porous solid or hygroscopic liquid under varying conditions.

The problem of quickly and accurately determining the change in weight of a sorbant is quite old in the analytical field. One attempt to solve this problem is described in U.S. Patent 2,692,497. As described in that patent, the apparatus comprises a vacuum-tight test chamber with a gas passage and means for admitting or evacuating gases, means to maintain a desired temperature, and gravimetric means within said chamber which supports a sample of the material to be tested. The gravimetric means shown are of two types: a beam balance, within said chamber, from one end of which is suspended a sample holder, and an electrical method for measuring the change in elongation of a spring. In the electrical method, a spring is suspended within said chamber, and a transformer core and a sample holder are hung in tandem from the spring. Transformer coils are wrapped around the chamber adjacent the core, and any movement of the core is measured by the change in output of the secondary coil of the transformer.

Unfortunately, the requirements of modern research require a method which eliminates the errors inherent in the above-described methods. For both methods, error is introduced into the determinations by changes in temperature and pressure within the chamber which may cause a change in apparent weight not due to adsorption but to a change in the buoyant force on the sample holder and transformer core or to a change in the elastic constant of the spring. In addition, in the electrical method it is very difficult to obtain an alternating current which doesn't vary to some degree. Any change in input voltage to the transformer coil would result in an indication of an apparent change of weight by the measuring device.

The extremely accurate measurements for which this apparatus is intended to be used are significantly affected by even the seemingly inconsequential errors introduced by the buoyancy and temperature effects. These are especially harmful when sorbing at partial pressures and over a wide range of temperatures.

In the study of adsorbents, or of porous solid catalysts such as those used in the various refining processes in the petroleum and petrochemical industry, the adsorption capacity, pore size and surface area are often critical in deciding what catalyst, or adsorbent catalyst support, to use for a given process. The values must be precisely known and a slight error in an experimental determination could result in a wrong decision, costing many thousands of dollars. The importance of being able to determine these values accurately has been of utmost importance for the past several years with the increasing use of solid catalysts in the form of beds of particles or fluidly flowing particles.

A device of great accuracy which can give a direct answer within a minimum length of time would be of inestimable value also for spot checks of catalyst in use to determine the effectiveness of the catalyst or adsorbent, after successive periods of operation.

This problem is now solved by the instant invention.

This device is designed to eliminate these sources of error by a combination of elements which automatically compensate for whatever error may be introduced by any changes in composition, density, or temperature of the fluid surrounding the sample.

Generally, this invention comprises a pressure-tight chamber, or an interconnected pair of chambers, and pressure and temperature varying systems for changing the gaseous environment within said chamber.

A sample holding means is attached to a gravimetric device within the chamber. A tare, substantially identical to the sample-holding means, is similarly attached to a gravimetric device within the chamber. The relative change in weight between the tare and the sample-holding means is therefore a measure only of the gain in weight of the adsorbent sample, the other factors being balanced out.

Figure 1:
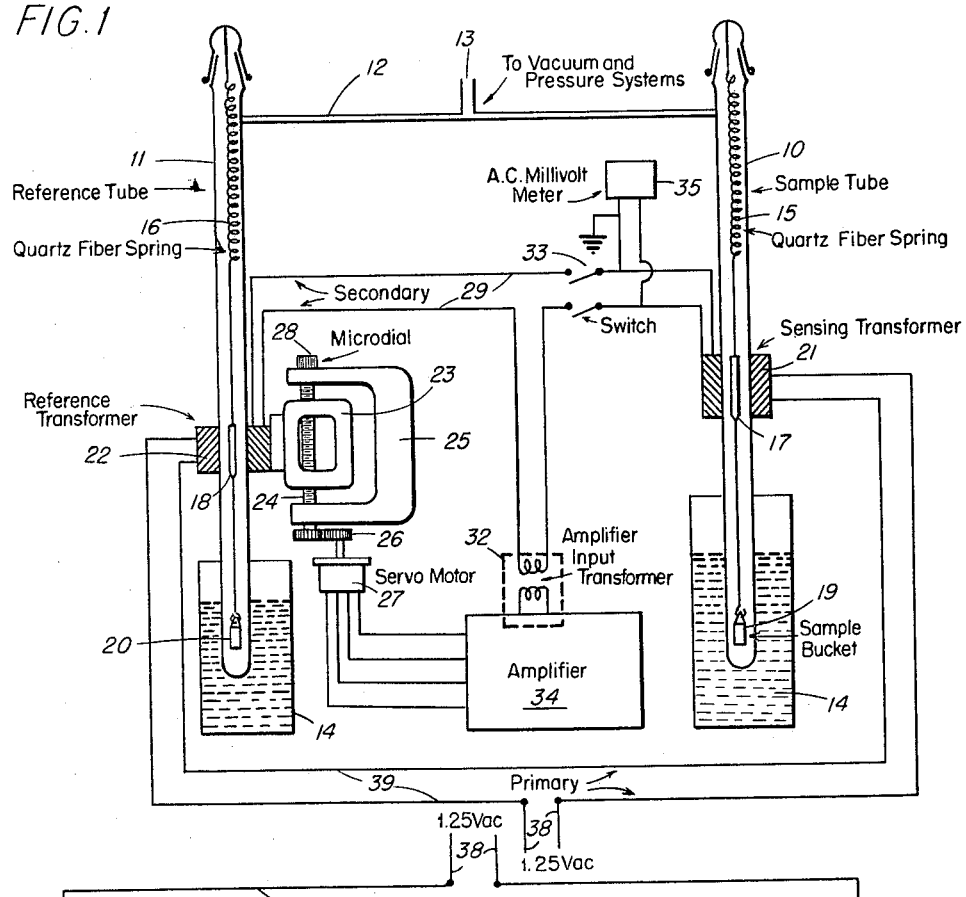
FIG. 1 is a schematic diagram of a specific embodiment of this invention.

Referring to FIG. 1, sample tube 10 and reference tube 11 are connected by conduit 12 to each other and to conduit 13 which leads from vacuum and pressure systems, not shown, for evacuating the tubes 10 and 11 or for admitting any fluid to them. Tubes 10 and 11 are at least partially immersed in temperature baths 14 for controlling the temperature of the gases within the tubes. Springs 15 and 16 are suspended within tubes 10 and 11 respectively; identical transformer cores 17 and 18 and sample bucket 19 and tare bucket 20 are hung in tandem from their respective springs 15 and 16.

Sensing transformer 21 encircles sample tube 10 at the point along its length where core 17 is located. Sensing transformer 21 is manually movable longitudinally with respect to tube 10. Movable reference transformer 22 encircles tube 11 at the point along its length where core 18 is located and is mounted on carriage 23 which rides on screw 24. Screw 24 is rotatably attached to yoke 25 (by two thrust bearings at each end which tend to eliminate all end play) and is turned through gear box 26 by servo-motor 27. Micro-dial 28 indicates the distance traveled by the transformer 22 for the given screw 24 (in this case 40 threads/inch).

Figure 2:
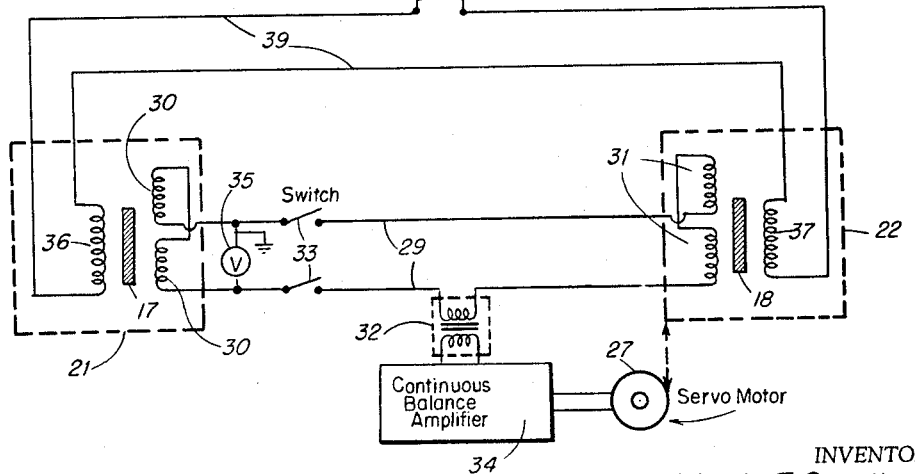
FIG. 2 is a wiring diagram for the embodiment of FIG. 1.

Referring to FIG. 2, for electrical wiring details, wire leads 29 connect the secondary coils 30 and 31 of transformers 21 and 22 respectively to amplifier input transformer 32 and switch 33. Each secondary coil 30 and 31 is divided into two equal sections longitudinually as shown, each section being coiled in opposite directions, so that the amplifier 34 can sense whether the core 17 has moved up or down by the change in voltage and the change in phase of the signal from secondary coil 30. When the core 17 is centered in the transformer 21 the net output from secondary coil 30 is zero. The current in the input transformer 32 is the resultant of the two opposing currents from secondary coils 30 and 31. A.C. millivolt meter 35 is connected to leads 29 at a point between secondary coil 30 and the switch 33 to enable it to read the net output voltage from secondary coil 30 only, when switch 33 is opened. Continuous balancing amplifier 34 is in electrical connection with input transformer 32 and servo-motor 27. The primary coils 36 and 37 of transformers 21 and 22 respectively are connected together and to A.C. source 38 by leads 39. This serves to cancel out any fluctuation in input voltage.

The springs 15 and 16 are preferably made from quartz fiber, because of its corrosion resistance and almost complete resistance to plastic deformation which would tend to keep the spring extension factor (F), see below, constant. The two springs preferably have equal spring constants. The tubes 10 and 11 are also preferably made of quartz or Pyrex, but may also be made of any non-corrosive, non-magnetic material such as a ceramic porcelain. A transparent material for tubes 10 and 11 is however preferable.

Generally, the device operates by seeking to balance the opposing E.M.F.'s from the secondary coils 30 and 31. An increase in weight in the test sample holder 19 will cause a corresponding elongation in spring 15 and a downward movement of the core 17. Movement of core 17 in any direction causes a change in permeability, and therefore output, of the secondary coil 30. This causes a current flow through the amplifier input transformer 32 and thus causes amplifier 34 to activate servo-motor 27 to move transformer 22 a corresponding distance until the E.M.F.'s are again balanced.

The device is calibrated by balancing E.M.F.'s with sample buckets empty, and then placing known weights into the sample bucket 19 and reading, on the micro-dial 28, the distance the transformer 22 traveled to balance out the change in position of core 17 caused by the extension of the spring 15 by the known weights. A spring extension factor is then computed:

$$F = \frac{\text{Dial units for a given wt. (on the microdial)}}{\text{Wt., grams}}$$

To determine the weight of gas adsorbed by a given amount of an adsorbent, a known quantity of the desired adsorbent, such as porous silica gel, is placed into the sample bucket 19 and the tubes 10 and 11 are evacuated. With switch 33 in the opened position sensing transformer 21 is manually adjusted until millivoltmeter 35 indicates a net zero current output from secondary coil 30. When switch 33 is closed, the servo-motor will be activated by any resulting current imbalance in the secondary coil circuit to move the transformer 22 until the current in the circuit is again zero. The test gas is then allowed to slowly bleed into the tubes 10 and 11 until the desired pressure is reached and the switch 33 is again closed to allow the reference transformer 22 to balance against the transformer 21. The change in the reading of the microdial is now a measure of the weight change in the sample. The procedure may of course be reversed to determine how much is desorbed from the sample by slowly evacuating the tubes and measuring the change in weight of the sample as above.

Gravimetric apparatus of this type may be used in the determination of many values based on the change in weight of a non-gaseous sample, including determining the surface area of a porous solid from adsorption data, the amount of vapor absorbed by a solid or a liquid, and it would even be possible to operate the device to determine how much liquid is absorbed, by filling the sample chamber with the desired liquid.

When operating with a liquid, or with certain gases at elevated pressure, where the fluid may have an appreciable effect on the permeability of the transformer, the use of the compensating reference transformer is especially valuable.

The apparatus used need not be as shown but may be varied in several ways: any pressure-tight chamber in which both the container and the tare are disposed in the same environment may be used, or the reference side need not contain a sample bucket but only the core and spring. Any other obvious changes and equivalents are intended to be within the scope of the invention, and nothing said hereinabove is to be construed as limiting the invention to the embodiments described below. The invention is defined and limited only by the claims below.

What is claimed is:

1. Apparatus for measuring the change in weight of a sorbant comprising in combination: an enclosed chamber, a source of test gas, means for admitting said gas to said chamber at any desired pressure so as to change the internal environment of said chamber, a container for holding said sorbant within said chamber, first resilient support means for supporting said container, a first transformer core supported by said resilient means, a first transformer having a primary and a secondary coil surrounding said core, a tare substantially identical to said container, second resilient support means for supporting said tare, a second transformer core supported by said second resilient means, a second transformer having a primary and a secondary coil surrounding said second core, means for impressing a substantially constant and equal potential onto said primary coils of said first and second transformers, means electrically connected between said secondary coils of said first and second transformers for generating a signal which is a function of the change in resultant output of said secondary coils, motor means for moving said second transformer in response to said signal, means for measuring the distance said second transformer has been moved whereby the distance which said second transformer is moved is a measure of the change in weight of said adsorbant material, and errors caused by the buoyance effect of changing pressure or the effect of changing temperature are compensated for.

2. The apparatus of claim 1 wherein said secondary coils of said first and second transformers are connected in opposition; whereby the resultant output from said first and second transformers is zero at the start of a test.

3. Apparatus for measuring the adsorptivity of a porous solid comprising in combination: a first enclosed tube and a second enclosed tube, a conduit connecting said tubes, a source of test fluid, means for admitting said fluid to said tubes at any desired pressure so as to change the internal environment of said tubes, a first spring held within said first tube, a sample container and a first transformer core suspended in tandem from said spring, a first transformer, having a primary and a secondary coil, surrounding said core outside of said first tube, a second spring held within said second tube, a second transformer core and a tare suspended in tandem from said second spring, a second transformer, having a primary and a secondary coil, surrounding said second core outside of said second tube, a yoke, a screw rotatably supported by said yoke, a carriage arranged and adapted to ride along said screw and to support said second transformer, an A.C. source for impressing on said primary coils of said first and second transformers a substantially constant potential, an amplifier electrically connected to said secondary coils of said first and second transformers, said amplifier being arranged and adapted to generate a signal which is a function of the resultant potential from said first and second secondary coils, a servo-motor arranged and adapted to rotate said screw in response to said signal, said second transformer being moved vertically relative to said second core when said screw is turned, a micro-dial operably connected to said screw to indicate the number of revolutions said screw makes and thereby measure the vertical distance moved by said second transformer; whereby the distance moved by said second transformer is a measure of the movement of said first core and thereby of the elongation of said first spring caused by the gain in weight due to sorption of the porous solid, the errors due to buoyancy and temperature effects being compensated for by said tare and second spring.

4. The apparatus of claim 3 wherein said tubes are at least partially immersed in a bath to maintain a constant and equal temperature in both of said tubes.

5. Apparatus for determining the absorptivity of a sample of solid material comprising in combination: an enclosed chamber, means for adjusting the gaseous environment in said chamber to any fixed condition, means for holding a sample of said solid material located within said enclosed chamber, first resilient support means for supporting said sample holding means within said chamber, a first transformer core mounted in said first resilient support means, a first transformer surrounding said first transformer core, a tare generally equivalent to said sample holding means located within said enclosed chamber, second resilient support means for supporting said tare, a second transformer core mounted in said second resilient support means, a second transformer surrounding said second transformer core, means for supplying a constant potential to the primary coils of said first and second transformers, means for measuring the difference in potential between the secondary coils of said first and second transformer, means for automatically adjusting the vertical elevation of said second transformer in response to said potential difference between the secondary coils of said first and second transformer, to reduce said potential to zero, and means for accurately indicating the movement of said second transformer.

6. Apparatus for measuring a change in weight of a sorbant in a gaseous environment, comprising gas-tight means defining a gaseous environment, sample-holding means disposed in said gas-tight means and adapted to hold a sample of a sorbant, a tare means also disposed in said gas-tight means and exposed to the same gaseous environment as the sample-holding means, first and second transformers, each of said transformers having an input coil, an output coil and a core intermediate said coils, first resilient means adapted to support said sample-holding means within said gaseous environment and to support the core of said first transformer, second resilient means adapted to support said tare means within said gaseous environment and to support the core of said second transformer, means for impressing substantially equal potentials onto the input coils of said transformers, means for generating a signal representative of the difference between the output voltages of said transformers, means responsive to said signal for moving said second transformer to equalize the output voltages of said transformers, and means to measure the travel of said second transformer as a measure of the change in weight of said sample.

References Cited in the file of this patent

UNITED STATES PATENTS

| | | |
|---|---|---|
| 1,394,696 | Templeton | Oct. 25, 1921 |
| 2,692,497 | Van Nordstrand | Oct. 26, 1954 |
| 2,772,383 | Bradley et al. | Nov. 27, 1956 |
| 2,880,985 | Roberts | Apr. 7, 1959 |